United States Patent
Rice et al.

(10) Patent No.: US 9,333,401 B2
(45) Date of Patent: May 10, 2016

(54) MULTI-PIECE DRIVER WITH SEPARATELY CAST HOSEL

(71) Applicant: CALLAWAY GOLF COMPANY, Carlsbad, CA (US)

(72) Inventors: Bradley C. Rice, Carlsbad, CA (US); Patrick Dawson, San Diego, CA (US); M. Grace Hohn, Escondido, CA (US)

(73) Assignee: Callaway Golf Company, Carlsbad, CA (US)

( * ) Notice: Subject to any disclaimer, the term of this patent is extended or adjusted under 35 U.S.C. 154(b) by 36 days.

(21) Appl. No.: 14/497,093

(22) Filed: Sep. 25, 2014

(65) Prior Publication Data
US 2015/0011325 A1  Jan. 8, 2015

Related U.S. Application Data

(62) Division of application No. 13/429,712, filed on Mar. 26, 2012, now abandoned.

(60) Provisional application No. 61/589,157, filed on Jan. 20, 2012.

(51) Int. Cl.
*A63B 53/04* (2015.01)
*A63B 53/02* (2015.01)
*A63B 53/06* (2015.01)

(52) U.S. Cl.
CPC ............. *A63B 53/02* (2013.01); *A63B 53/0466* (2013.01); *A63B 53/06* (2013.01); *A63B 2053/0433* (2013.01); *A63B 2053/0445* (2013.01); *A63B 2053/0458* (2013.01); *A63B 2053/0491* (2013.01); *A63B 2209/00* (2013.01)

(58) Field of Classification Search
CPC ............... A63B 53/02; A63B 53/0466; A63B 2053/0445; A63B 2053/0425
See application file for complete search history.

(56) References Cited

U.S. PATENT DOCUMENTS

| | | | | |
|---|---|---|---|---|
| 6,106,412 A * | 8/2000 | Kosugi | ............ | A63B 53/02 473/305 |
| 6,595,871 B2 * | 7/2003 | Sano | ............ | A63B 53/04 473/342 |
| 6,949,031 B2 * | 9/2005 | Imamoto | ............ | A63B 53/04 473/329 |
| 7,367,899 B2 * | 5/2008 | Rice | ............ | A63B 53/0466 473/329 |
| 7,575,523 B2 * | 8/2009 | Yokota | ............ | A63B 53/0466 473/332 |
| 7,749,095 B2 * | 7/2010 | Nishitani | ............ | A63B 53/02 473/305 |
| 7,785,213 B2 * | 8/2010 | Matsunaga | ............ | A63B 53/047 473/342 |
| 8,409,032 B2 * | 4/2013 | Myrhum | ............ | A63B 53/0466 473/342 |
| 8,561,876 B2 * | 10/2013 | Yamamoto | ............ | A63B 53/02 228/101 |
| 2002/0094880 A1 * | 7/2002 | McCabe | ............ | A63B 53/02 473/305 |
| 2005/0045253 A1 * | 3/2005 | De La Cruz | ............ | A63B 53/0466 148/522 |
| 2005/0085313 A1 * | 4/2005 | Nishitani | ............ | A63B 53/02 473/305 |
| 2006/0094531 A1 * | 5/2006 | Bissonnette | ............ | A63B 53/0466 473/329 |
| 2009/0042665 A1 * | 2/2009 | Morales | ............ | A63B 53/02 473/305 |
| 2009/0197694 A1 * | 8/2009 | Soracco | ............ | A63B 53/02 473/288 |

* cited by examiner

*Primary Examiner* — Stephen Blau
(74) *Attorney, Agent, or Firm* — Rebecca Hanovice; Michael Catania; Sonia Lari

(57) ABSTRACT

The present invention is directed to a multi-piece golf club head having a metal hosel with adjustability features that is cast separately from a face component, sole, and crown, and then is permanently affixed to those other parts after casting is complete. The face component, sole, and crown may be composed of any suitable materials, but preferably each of the face component, the sole, and the crown are stamped from a metal material and are welded to the hosel.

10 Claims, 6 Drawing Sheets

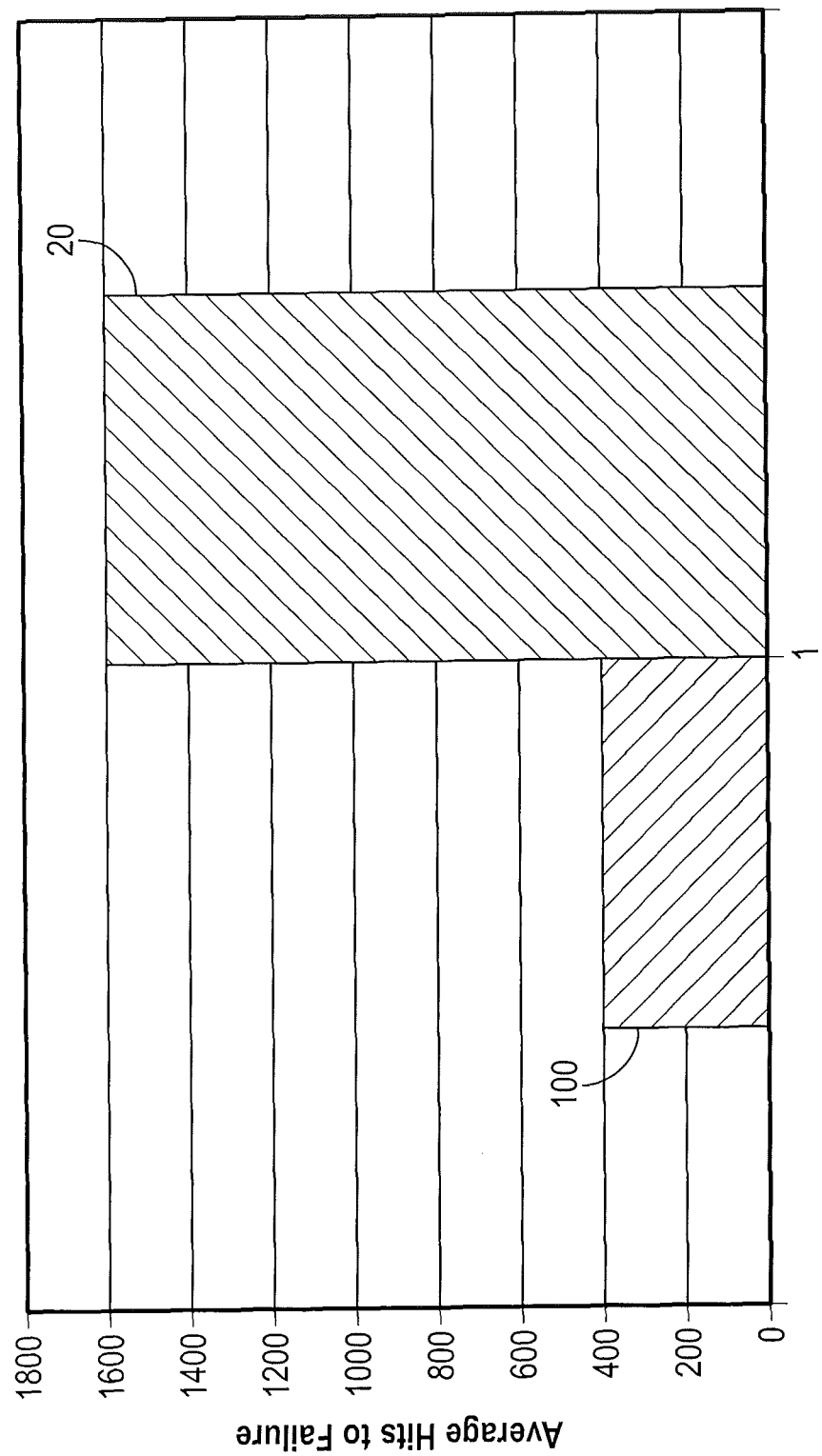

MULTI-PIECE DRIVER WITH SEPARATELY CAST HOSEL

CROSS REFERENCES TO RELATED APPLICATIONS

The present application is a division of U.S. patent application Ser. No. 13/429,712, filed on Mar. 26, 2012, and claims priority to U.S. Provisional Patent Application No. 61/589,157, filed on Jan. 20, 2012, the disclosure of each of which is incorporated by reference in its entirety herein.

STATEMENT REGARDING FEDERALLY SPONSORED RESEARCH OR DEVELOPMENT

Not Applicable

BACKGROUND OF THE INVENTION

1. Field of the Invention

The present invention relates to a multi-piece golf club head having a separately cast metal hosel.

2. Description of the Related Art

Golf club manufacturers have traditionally used expensive tooling or machining to form hosels in metal, wood-type golf clubs in an effort to make their designs more affordable and producible on a mass scale. This is particularly true for manufacturing multi-piece drivers, which typically include separately formed crowns, soles, and face components. The hosel element of the driver is complex because it needs to connect to all of these pieces, but machining or forming the hosel limits the overall geometry and complexity of the resulting club head.

These manufacturing limitations can lead to issues with material availability and strength. In particular, the materials that permit machining or tooling usually are not strong enough to accommodate current adjustable hosel designs. In fact, testing of multi-piece driver designs having machined or tooled adjustable hosels has revealed cracking and failure in various features of the adjustable hosels, even if the material used is easily forged and permits good tool life. The use of stronger material to machine or tool adjustable hosels is also not ideal, as it causes too much wear on the tool and takes too long to machine for production purposes. As such, there is a need for strong, durable adjustable hosel constructions that can be produced efficiently and used with multi-piece golf club heads.

BRIEF SUMMARY OF THE INVENTION

The present invention is directed to a golf club head having a separately cast hosel, which replaces the traditionally machined or formed hosel. The casting allows the hosel to have complex geometry, including adjustability features, without requiring additional material cost or tool wear expense. The materials used in casting are also stronger, leading to more durable, less brittle hosel features.

One aspect of the present invention is a wood-type golf club head comprising a crown, a sole, a face component, and a hosel, wherein the hosel is cast from a metal material, wherein the hosel is not integrally formed with any other part of the golf club head, and wherein the hosel is permanently affixed to at least one of the crown, sole, and face component after casting is complete. The golf club head may be a driver head, and the hosel may be cast from a titanium alloy, such as 6-4 titanium. Each of the crown, sole, and face component may be stamped from a metal sheet, and the hosel may be permanently affixed to each of the crown, sole, and face component by welding. The hosel may comprise an adjustability feature, including one selected from the group consisting of a plurality of teeth, a plurality of pins, a plurality of holes, and a plurality of ridges. The hosel may comprise a hosel tube, which may have a hosel bore sized to receive a shaft. The hosel tube may further comprise an internal flange, and it may also have an upper end and a lower end disposed proximate a sole opening.

In a further embodiment, the face component and the sole may be integrally cast from a metal material, and the face component may comprise a cut-out sized to receive at least a part of the hosel. The face component may be composed of a metal alloy, while the sole and crown may each be composed of a composite material. The face component may further comprise a striking face and a return portion, and the return portion may comprise a through bore sized to receive at least a part of the hosel. The hosel may further comprise a first extension composed of portion of the face component, a second extension composed of a portion of the crown, and a third extension composed of a portion of the sole, the face component may comprise a first cutout that mates with the first extension, the crown may have a second cutout that mates with the second extension, and the sole may have a third cutout that mates with the third extension. The face component may further comprise a striking surface having a variable thickness pattern, and the sole may comprise at least one weight port. The club may further comprise at least one removable weight.

Another aspect of the invention is a driver-type golf club head comprising a face component comprising a striking face, a return portion, and a first cutout, the face component composed of a metal material, a sole comprising a second cutout, the sole composed of a metal material, a crown comprising a third cutout, the crown composed of a metal material, and a metal hosel comprising a hosel tube, an adjustability feature, a first extension, a second extension, and a third extension, the hosel cast separately from all other parts of the golf club head, wherein the first extension mates with the first cutout, the second extension mates with the second cutout, and the third extension mates with the third cutout, wherein the metal hosel is welded to the face component, the sole, and the crown. In a further embodiment, each of the face component, the sole, and the crown may be stamped from a metal sheet, and the hosel may be composed of 6-4 titanium.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 5 is a graph comparing failure rates of a traditional golf club head with the embodiment shown in FIGS. 2A, 2B, and 2C.

DETAILED DESCRIPTION OF THE INVENTION

The present invention provides an improvement to the existing art of golf club manufacturing because it employs a separately cast hosel in a golf club head instead of machined or formed hosels. This improvement allows for the use of strong construction materials to support the complex geometry required to combine the hosel with other parts of the golf club head. The invention also allows for high, and efficient, production throughput during golf club manufacturing.

Figure 1C:
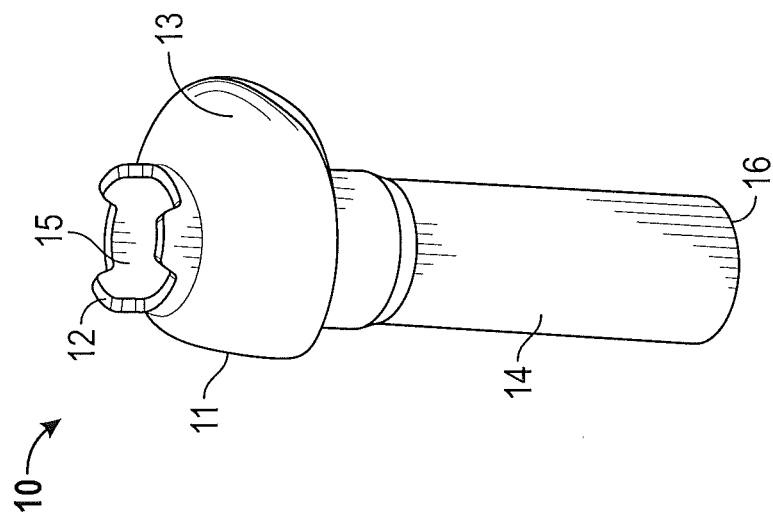
FIGS. 1A, 1B, and 1C are perspective views of a first embodiment of the cast hosel of the present invention.
Figure 1B:
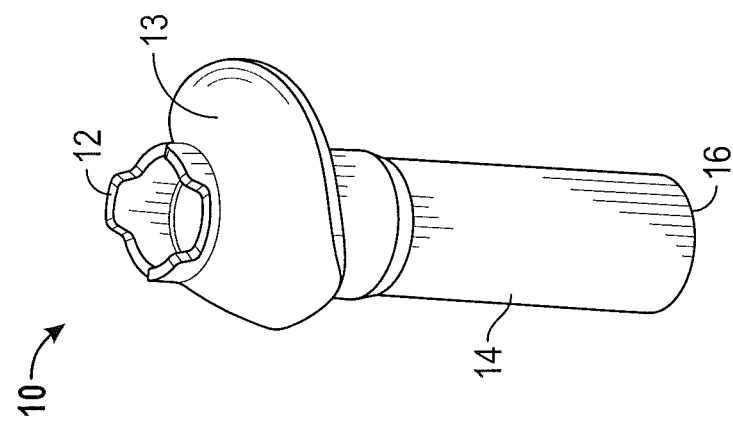
Figure 1A:
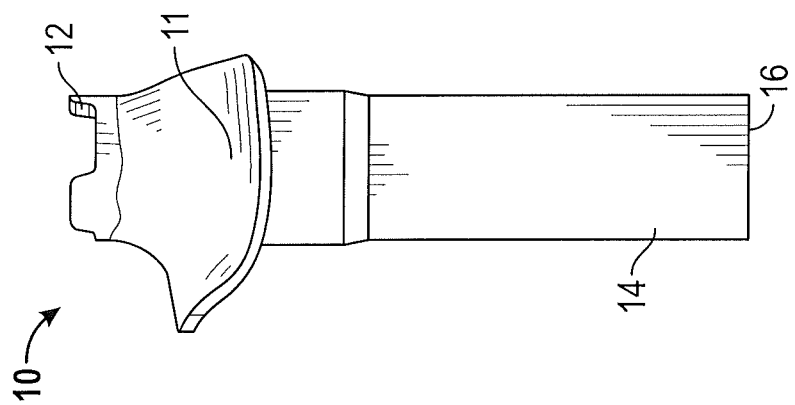

A preferred embodiment of the present invention is illustrated in FIGS. 1A-2B. As shown in FIGS. 1A-1C, the preferred embodiment includes a cast hosel 10 having a hosel tube 14 having a hosel bore 15 sized to releasably receive a shaft, a face portion 11, a crown portion 13, and a sole portion 16. The hosel bore 15 may further include a flange, such as the one shown in U.S. Pat. Nos. 8,096,895 and 8,002,644. The hosel also includes one or more adjustability features 12 which can be used to allow adjustment or interchangeability of a shaft. The adjustability features 12 shown in FIGS. 1A-1C are teeth, but they may in alternative embodiments be ridges, pins, holes, or other mating designs, such as those described in U.S. Pat. Nos. 8,096,895, 8,002,644, and 2,027,452, the relevant disclosures of which are hereby incorporated in their entireties herein. The hosel 10 is preferably cast from 6-4 titanium, or another strong titanium alloy, to prevent the adjustability features 12 from bending or cracking.

Figure 2A:
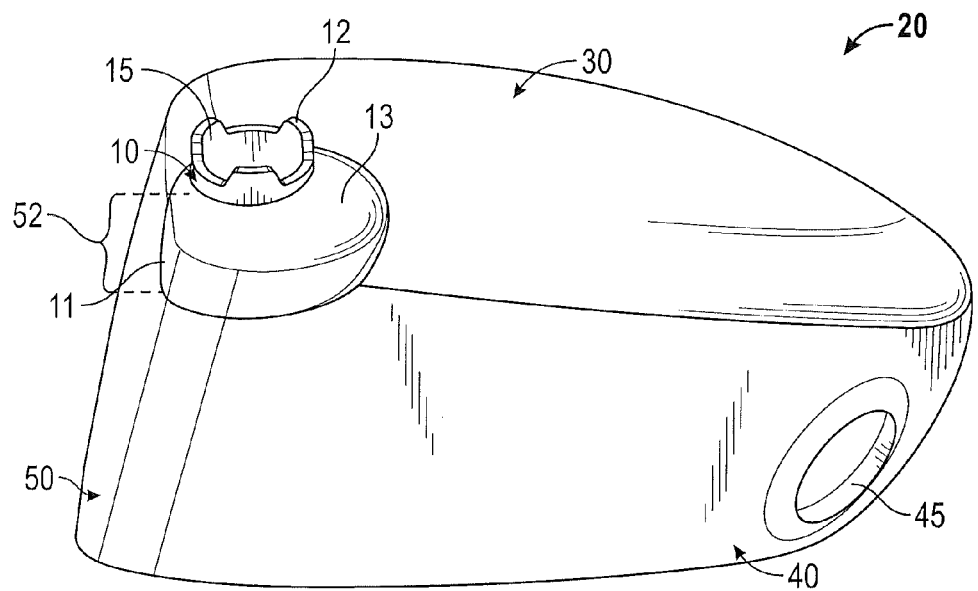
FIG. 2A is a heel side perspective view of a driver including the cast hosel shown in FIGS. 1A-1C.
Figure 2B:
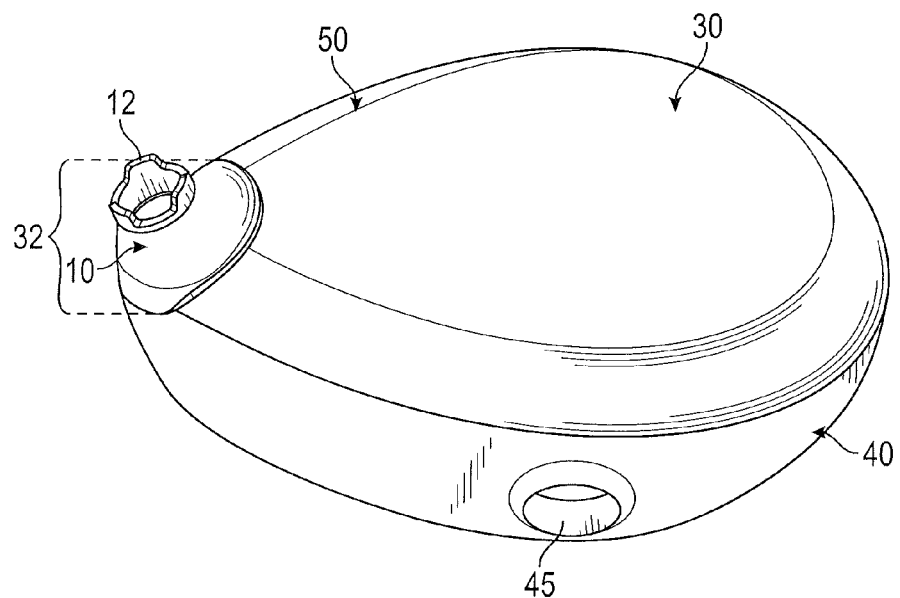
FIG. 2B is a rear perspective views of the driver shown in FIG. 2A.
Figure 2C:
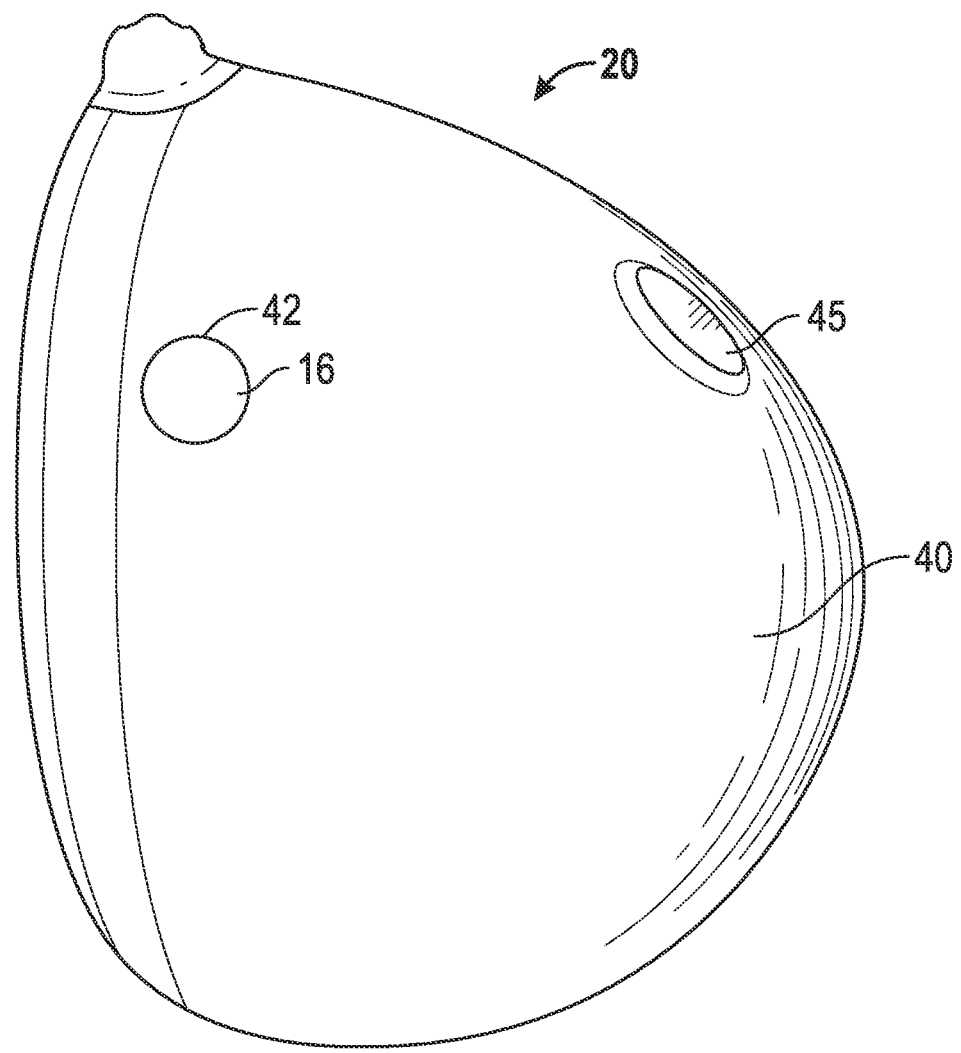
FIG. 2C is a sole perspective view of the driver shown in FIGS. 2A and 2B.
Figure 3A:
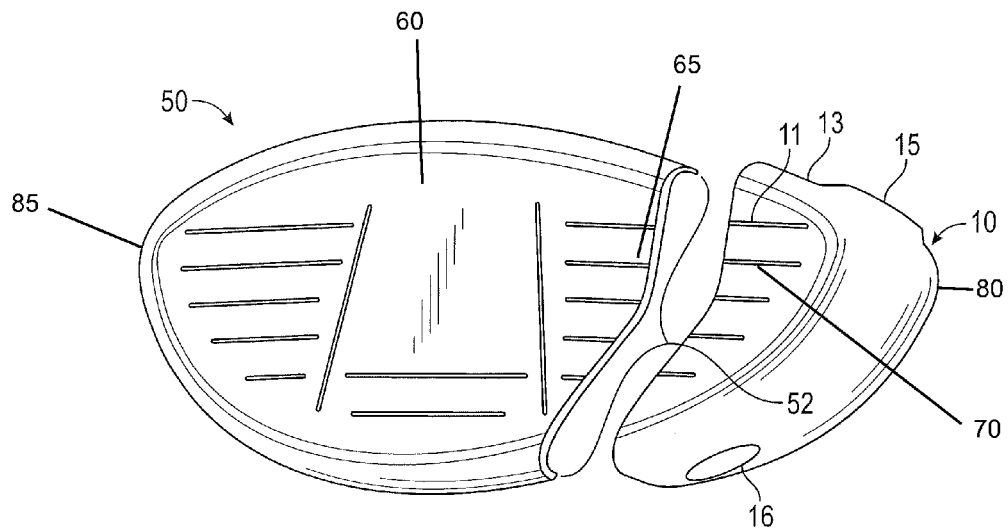
FIGS. 3A and 3B are front and back, exploded, perspective views of an alternative embodiment of the cast hosel of the present invention in combination with a face component.
Figure 3B:
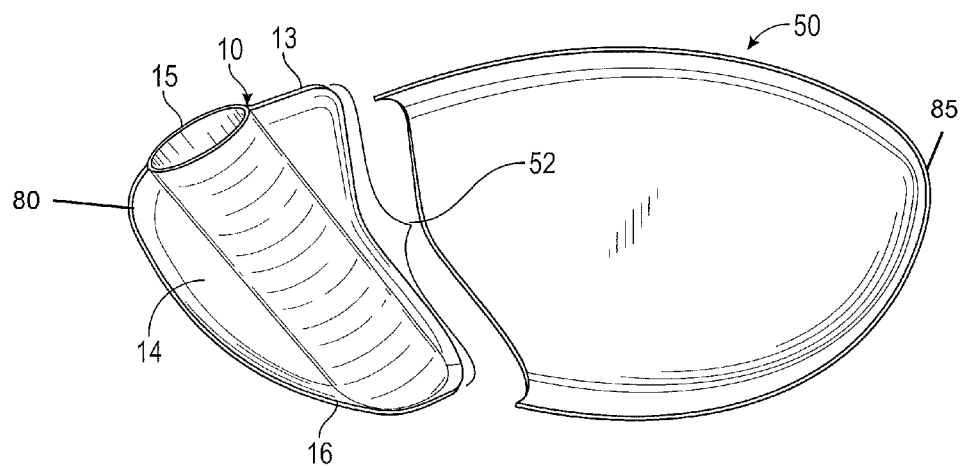
Figure 4A:
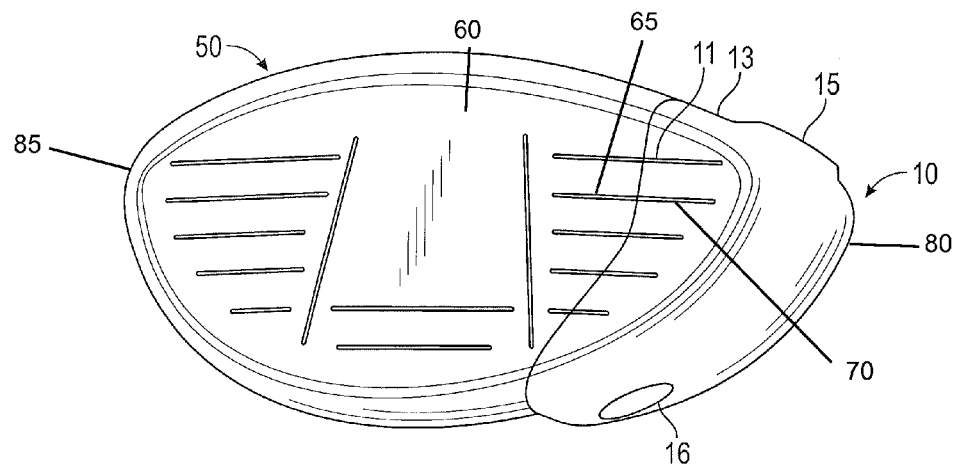
FIGS. 4A and 4B are front and back perspective views of the hosel and face component shown in FIGS. 3A and 3B welded together.
Figure 4B:
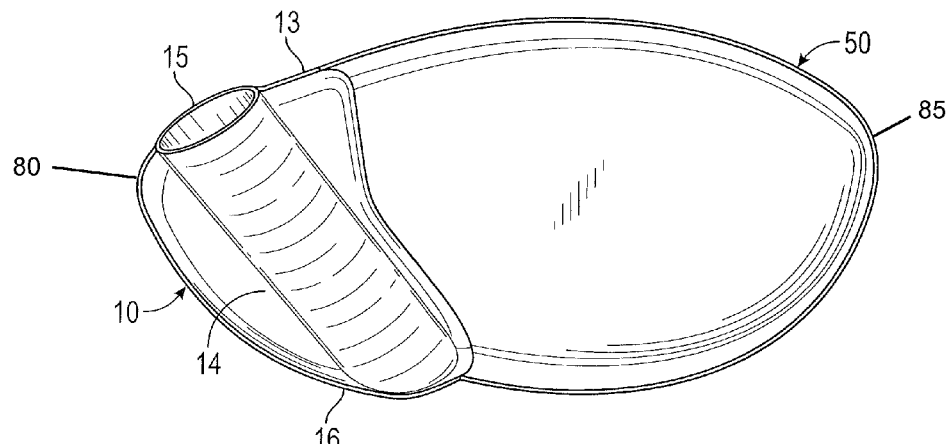

The cast hosel 10 shown in FIGS. 1A-1C is combined with a crown 30, a sole 40, and a face component 50 to form the club head 20 shown in FIGS. 2A, 2B, and 2C. In the preferred embodiment, the club head 20 is a driver, but it may in alternative embodiments be any other kind of wood-type club head, including fairway woods and hybrids. As shown in FIGS. 2A, 2B, and 2C, the crown 30 comprises a cutout 32, the sole 40 comprises a cutout 42, and the face component 50 comprises a cutout 52, each of which mate with or fit around the respective crown, sole, and face portions 13, 16, 11 of the cast hosel 10. In the preferred embodiment, each of the crown 30, sole 40, and face component 50 is stamped from a metal sheet, preferably a titanium alloy sheet, and is welded to the cast hosel 10 along each of the cutouts 32, 42, 52. The sole 40 of the preferred embodiment also comprises at least one weight port 45 sized to receive a removable weight (not shown).

A second embodiment of the present invention is shown in FIGS. 3A, 3B, 4A, and 4B. The cast hosel 10 of this embodiment has larger face, crown, and sole portions 11, 13, 16 than the cast hosel 10 of the preferred embodiment, and the face component 50 of this embodiment has a larger cutout 52 area along which the face component 50 and hosel 10 are welded to one another. The face component 50 also comprises a toe side 85 and a striking face 60 with a first plurality of grooves 65 that align with a second plurality of grooves 70 disposed on the face portion 11 of the hosel 10 when the hosel 10 is assembled with the face component 50. As shown in these Figures, in this embodiment the cast hosel 10 preferably makes up an entire heel side 80 of the face component 50 when the hosel 10 is assembled with the face component 50.

The golf club head 20 including the hosel 10 of the present invention is more structurally sound and durable than a traditional golf club 100 having a hosel that is integrally formed with or machined into a face component. In fact, as shown in FIG. 5, the preferred embodiment of the golf club head 20 of the present invention can withstand an average of approximately 1600 hits before it cracks, whereas a golf club 100 having a traditional, integrally formed hosel can withstand an average of only approximately 400 hits before it cracks.

In alternative embodiments, the face component may be formed of a forged or cast metal alloy, and one or more of the sole and crown may be composed of a composite material. In yet another embodiment, the face and sole may be integrally cast from a metal material. The face component may in some embodiments be a face cup comprising a striking surface and a return portion, which may have a cutout sized to receive the hosel.

Each of the parts of the golf club head 20 of the present invention may be made from various materials, including, but not limited to, titanium and titanium alloys, magnesium, aluminum, tungsten, carbon or graphite composite, plastic, stainless steel, etc. In some embodiments, the entire club head is made of one material. In other embodiments, the club head is made of two or more materials. The golf club of the present invention may also have material compositions such as those disclosed in U.S. Pat. Nos. 6,244,976, 6,332,847, 6,386,990, 6,406,378, 6,440,008, 6,471,604, 6,491,592, 6,527,650, 6,565,452, 6,575,845, 6,478,692, 6,582,323, 6,508,978, 6,592,466, 6,602,149, 6,607,452, 6,612,398, 6,663,504, 6,669,578, 6,739,982, 6,758,763, 6,860,824, 6,994,637, 7,025,692, 7,070,517, 7,112,148, 7,118,493, 7,121,957, 7,125,344, 7,128,661, 7,163,470, 7,226,366, 7,252,600, 7,258,631, 7,314,418, 7,320,646, 7,387,577, 7,396,296, 7,402,112, 7,407,448, 7,413,520, 7,431,667, 7,438,647, 7,455,598, 7,476,161, 7,491,134, 7,497,787, 7,549,935, 7,578,751, 7,717,807, 7,749,096, and 7,749,097, the disclosure of each of which is hereby incorporated in its entirety herein.

The golf club head 20 of the present invention may be constructed to take various shapes, including traditional, square, rectangular, or triangular. In some embodiments, the golf club head of the present invention takes shapes such as those disclosed in U.S. Pat. Nos. 7,163,468, 7,166,038, 7,169,060, 7,278,927, 7,291,075, 7,306,527, 7,311,613, 7,390,269, 7,407,448, 7,410,428, 7,413,520, 7,413,519, 7,419,440, 7,455,598, 7,476,161, 7,494,424, 7,578,751, 7,588,501, 7,591,737, and 7,749,096, the disclosure of each of which is hereby incorporated in its entirety herein.

The face component 50 of the present invention may also have variable face thickness, such as the thickness patterns disclosed in U.S. Pat. Nos. 5,163,682, 5,318,300, 5,474,296, 5,830,084, 5,971,868, 6,007,432, 6,338,683, 6,354,962, 6,368,234, 6,398,666, 6,413,169, 6,428,426, 6,435,977, 6,623,377, 6,997,821, 7,014,570, 7,101,289, 7,137,907, 7,144,334, 7,258,626, 7,422,528, 7,448,960, 7,713,140, and 8,012,041, the disclosure of each of which is incorporated in its entirety herein.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims.

Therefore, the embodiments of the invention in which an exclusive property or privilege is claimed are defined in the following appended claims.

We claim as our invention:

1. A driver-type golf club head comprising:
   a head upper surface;
   a head lower surface;
   a striking face comprising a face heel side extending from the head upper surface to the head lower surface, a face toe side extending from the head upper surface to the head lower surface, and a face center extending from the head upper surface to the head lower surface and disposed between the face heel side and face toe side;
   a metal face component comprising a front portion, a return portion, and a first cutout disposed in the front portion such that the front portion forms the face toe side of the striking face and the face center of the striking face but not the face heel side of the striking face;
   a metal sole comprising a second cutout;
   a metal crown comprising a third cutout; and
   a metal hosel comprising a hosel tube, an adjustability feature, a first extension, a second extension, and a third extension, the hosel cast separately from all other parts of the golf club head,
   wherein the front portion comprises a first plurality of grooves,
   wherein the first extension forms the face heel side of the striking face and comprises a second plurality of grooves,
   wherein the first extension mates with the first cutout in the front portion to form the striking face such that the first plurality of grooves aligns with the second plurality of grooves, the second extension mates with the second cutout in the sole to form the head lower surface, and the third extension mates with the third cutout in the crown to form the head upper surface, and
   wherein the metal hosel is welded to the face component, the sole, and the crown.

2. The driver-type golf club head of claim 1, wherein the metal hosel is cast from a titanium alloy.

3. The driver-type golf club head of claim 2, wherein the hosel tube comprises an internal flange.

4. The driver-type golf club head of claim 3, further comprising at least one removable weight.

5. The driver-type golf club head of claim 2, wherein the hosel tube comprises an upper end and a lower end, wherein the sole comprises a sole opening, and wherein the lower end is disposed proximate the sole opening.

6. The driver-type golf club head of claim 1, wherein the adjustability feature is selected from the group consisting of a plurality of teeth, a plurality of pins, a plurality of holes, and a plurality of ridges.

7. The driver-type golf club head of claim 6, wherein the adjustability feature is a plurality of teeth.

8. The driver-type golf club head of claim 1, wherein the hosel tube comprises a hosel bore sized to receive a shaft.

9. The driver-type golf club head of claim 1, wherein the striking face comprises a variable thickness pattern.

10. The driver-type golf club head of claim 1, wherein the sole comprises at least one weight port.

* * * * *